United States Patent
Bragg et al.

(10) Patent No.: US 8,238,245 B2
(45) Date of Patent: *Aug. 7, 2012

(54) PLANNING ROUTES AND ALLOCATING IDENTIFIERS TO ROUTES IN A MANAGED FRAME-FORWARDING NETWORK

(75) Inventors: Nigel Bragg, Weston Colville (GB); Paul Bottorff, Palo Alto, CA (US); David Allan, Ottawa (CA); Robert Friskney, Harlow (GB); Simon Parry, Harlow (GB)

(73) Assignee: Rockstar Bidco, LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/752,228

(22) Filed: Apr. 1, 2010

(65) Prior Publication Data
US 2010/0189015 A1   Jul. 29, 2010

Related U.S. Application Data

(63) Continuation of application No. 11/343,996, filed on Jan. 31, 2006, now Pat. No. 7,756,035.

(51) Int. Cl.
*H04L 12/26* (2006.01)
*H04L 12/28* (2006.01)
*H04L 12/56* (2006.01)
*G06F 15/16* (2006.01)
*G06F 15/173* (2006.01)

(52) U.S. Cl. ............... 370/235; 370/256; 370/395.32; 370/408; 709/238; 709/252

(58) Field of Classification Search .......... 370/235, 370/256, 395.32, 408; 709/238, 252
See application file for complete search history.

(56) References Cited

U.S. PATENT DOCUMENTS

| | | | |
|---|---|---|---|
| 4,864,559 A * | 9/1989 | Perlman | 370/256 |
| 5,245,609 A | 9/1993 | Ofek | |
| 5,606,669 A | 2/1997 | Bertin | |
| 5,608,649 A | 3/1997 | Gopinath | |
| 5,740,366 A | 4/1998 | Mahany | |
| 5,926,101 A | 7/1999 | Dasgupta | |
| 5,961,597 A | 10/1999 | Sapir | |
| 6,246,669 B1 * | 6/2001 | Chevalier et al. | 370/238 |

(Continued)

FOREIGN PATENT DOCUMENTS
EP    1545070    6/2005

*Primary Examiner* — Alpus H Hsu
(74) *Attorney, Agent, or Firm* — Withrow & Terranova, PLLC

(57) ABSTRACT

A method is provided of planning routes and allocating route identifiers in a managed frame-forwarding network. The network comprises a plurality of nodes interconnected by links, with each node being arranged to forward data frames according to a combination of an identifier and a network address carried by a received data frame and forwarding instructions stored at the node. A first step of the method identifies a sub-set of nodes which are core nodes of the network. The remaining nodes are termed outlying nodes. A spanning tree is then built off each of the identified core nodes, with the spanning tree stopping one link short of any other core node. Each spanning tree defines a loop-free path between a core node at the root of the spanning tree and a set of outlying nodes. Connections are planned between roots of the spanning trees and a different identifier is allocated to each planned connection between a pair of spanning trees.

13 Claims, 11 Drawing Sheets

U.S. PATENT DOCUMENTS

| | | | |
|---|---|---|---|
| 6,304,575 B1 * | 10/2001 | Carroll et al. | 370/408 |
| 6,353,596 B1 | 3/2002 | Grossglauser | |
| 6,388,995 B1 | 5/2002 | Gai | |
| 6,519,231 B1 | 2/2003 | Ding | |
| 6,600,724 B1 | 7/2003 | Cheng | |
| 6,683,865 B1 * | 1/2004 | Garcia-Luna-Aceves et al. | 370/349 |
| 6,721,275 B1 * | 4/2004 | Rodeheffer et al. | 370/238 |
| 6,728,777 B1 * | 4/2004 | Lee et al. | 709/238 |
| 6,760,340 B1 * | 7/2004 | Banavar et al. | 370/408 |
| 6,771,593 B2 * | 8/2004 | Popovich | 370/218 |
| 6,836,463 B2 * | 12/2004 | Garcia-Luna-Aceves et al. | 370/238 |
| 6,856,991 B1 * | 2/2005 | Srivastava | 1/1 |
| 6,873,618 B1 * | 3/2005 | Weaver | 370/390 |
| 6,912,205 B2 * | 6/2005 | Perlman et al. | 370/254 |
| 6,963,575 B1 * | 11/2005 | Sistanizadeh et al. | 370/404 |
| 6,976,088 B1 | 12/2005 | Gai | |
| 7,088,674 B2 | 8/2006 | MacKiewich | |
| 7,177,295 B1 * | 2/2007 | Sholander et al. | 370/338 |
| 7,280,488 B2 | 10/2007 | Shibasaki | |
| 7,362,709 B1 * | 4/2008 | Hui et al. | 370/237 |
| 7,369,541 B2 * | 5/2008 | Hundscheidt et al. | 370/352 |
| 7,400,589 B2 | 7/2008 | Zhang | |
| 7,443,800 B2 | 10/2008 | Imai | |
| 7,532,588 B2 | 5/2009 | Enomoto | |
| 7,606,186 B2 * | 10/2009 | Hundscheidt et al. | 370/312 |
| 7,623,533 B2 * | 11/2009 | Wakumoto et al. | 370/406 |
| 7,881,229 B2 * | 2/2011 | Weinstein et al. | 370/255 |
| 2002/0133701 A1 | 9/2002 | Lotspiech | |
| 2003/0058857 A1 | 3/2003 | Maher | |
| 2003/0210695 A1 * | 11/2003 | Henrion | 370/392 |
| 2007/0076719 A1 * | 4/2007 | Allan et al. | 370/392 |
| 2007/0097859 A1 | 5/2007 | Tancevski | |
| 2007/0110024 A1 * | 5/2007 | Meier | 370/351 |

* cited by examiner

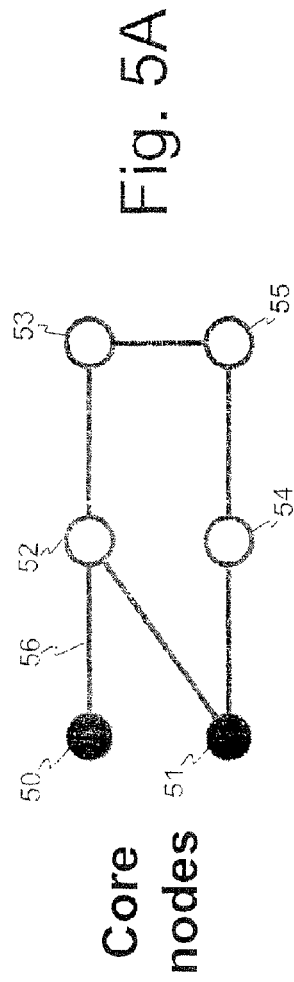
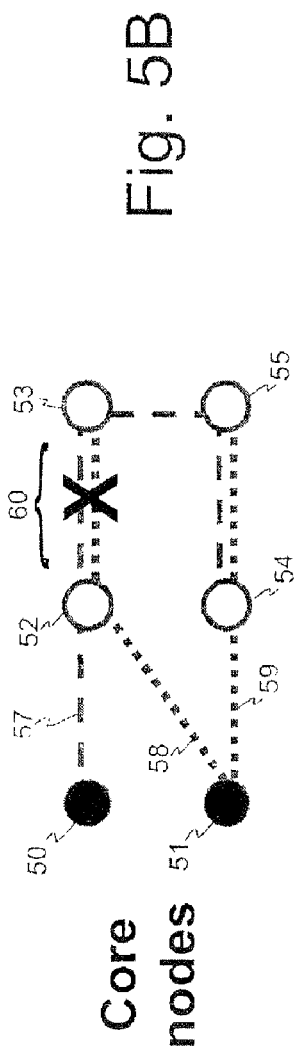
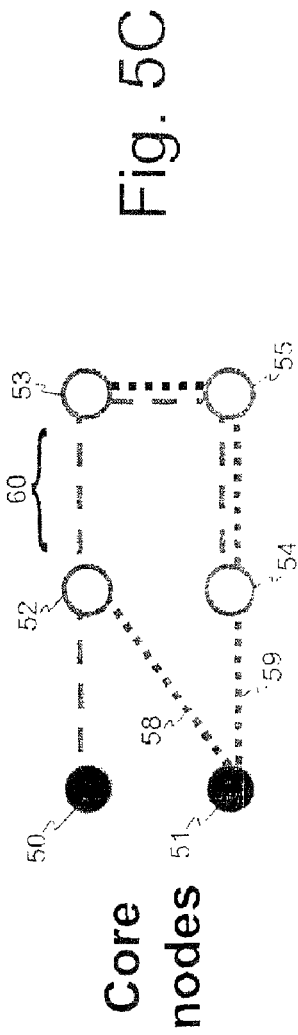

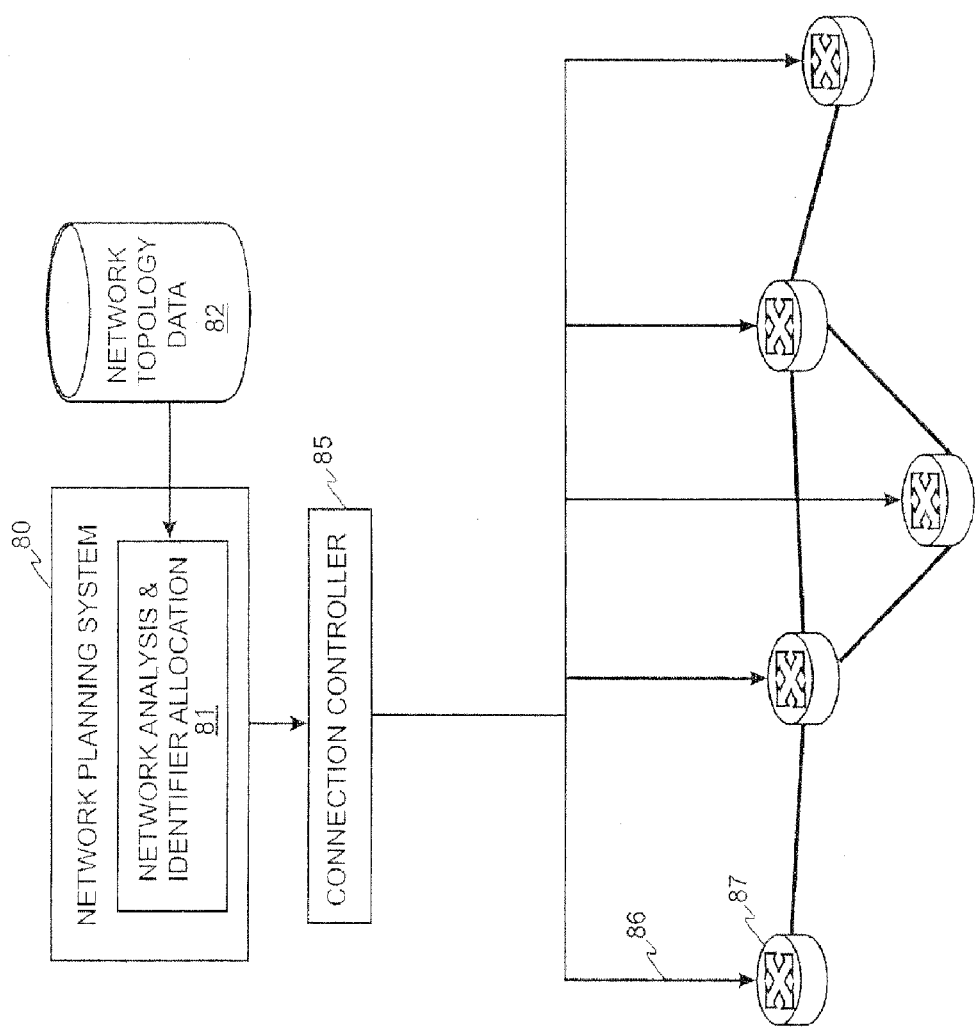

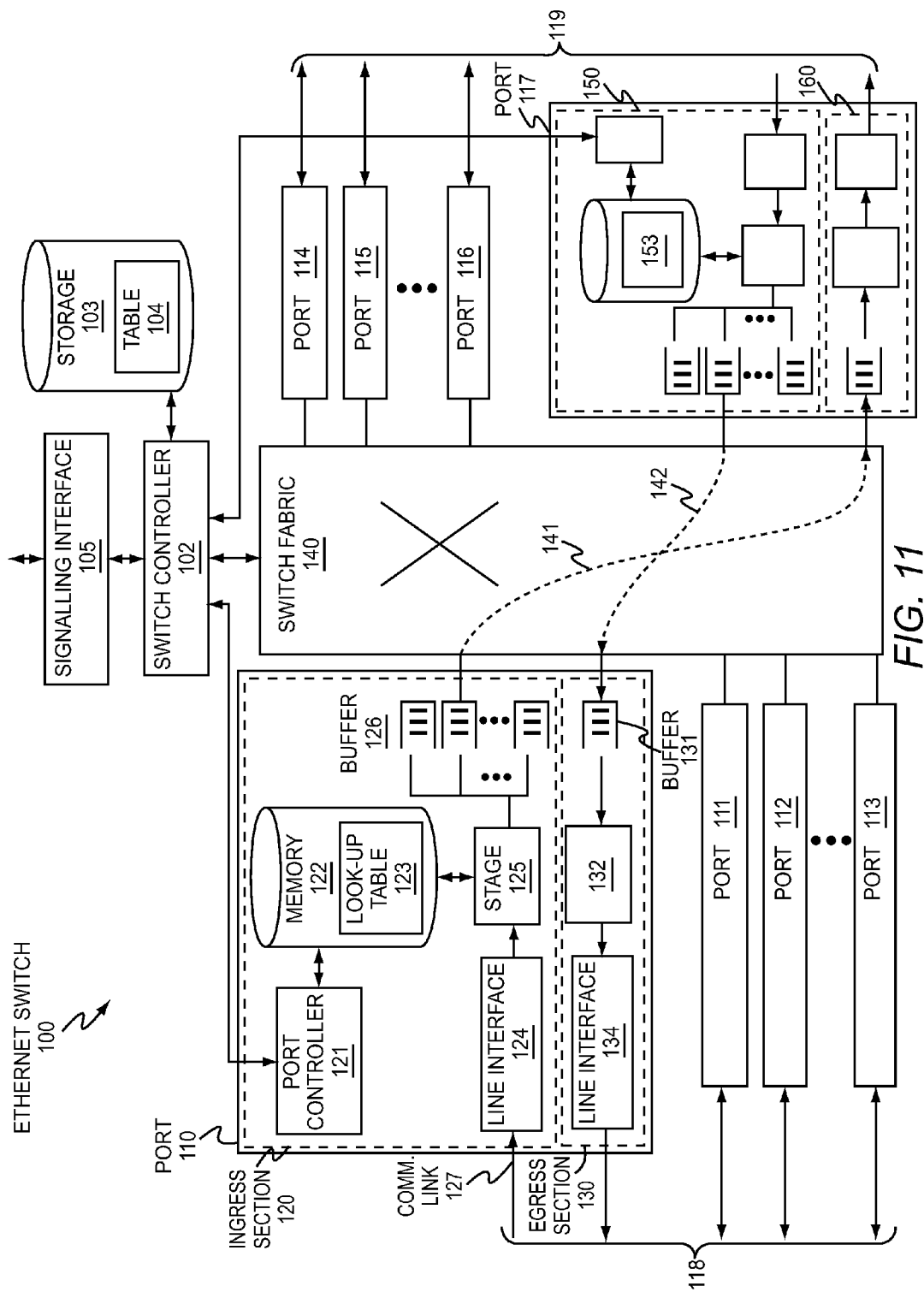

PLANNING ROUTES AND ALLOCATING IDENTIFIERS TO ROUTES IN A MANAGED FRAME-FORWARDING NETWORK

CROSS-REFERENCE TO RELATED APPLICATION

This is a continuation of U.S. Ser. No. 11/343,996, filed Jan. 31, 2006 now U.S. Pat. No. 7,756,035, which is hereby incorporated by reference.

BACKGROUND TO THE INVENTION

For many years now, telecommunications carriers have been deploying packet-switched networks in place of, or overlaid upon, circuit-switched networks for reasons of efficiency and economy. Packet-switched networks such as Internet Protocol (IP) or Ethernet networks are intrinsically connectionless in nature and, as a result, suffer from Quality of Service (QoS) problems. Customers value services which are guaranteed in terms of bandwidth and QoS.

It is desired to use Ethernet switches in carriers' networks. Use of Ethernet switches in carriers' networks would have the advantages of interoperability (mappings between Ethernet and other frame/packet/cell data structures such as IP, Frame Relay and ATM are well known) and economy (Ethernet switches are relatively inexpensive compared to IP routers, for example). It would also provide a distinct advantage of being the principal technology used by enterprises that require a wide area network service from a carrier and therefore able to work in a native mode. In view of the above, there have proposals to implement 'Connection-oriented Ethernet' (CoE) networks where managed traffic paths (connections) are set up across a network of Ethernet switches in contrast to conventional Ethernet paths where switches decide for themselves how to forward packets. One such proposal is described in WO 2005/099183. In WO 2005/099183 a network manager instructs each Ethernet switch along a route to store forwarding information. The switch uses the forwarding information to forward received data frames. A particular combination of identifiers in a data frame, such as a Virtual Local Area Network Identifier (VLAN ID or VID) and a destination address (DA) are used to differentiate traffic routes.

In a conventional destination-based forwarding scheme such as Ethernet, a single address entry in the bridging table at an intermediate switch is sufficient for all sources to reach a destination if all sources use the same route. In a network of the type described in WO 2005/099183 VIDs are used as route discriminators, allowing multiple routes to be followed to a destination. This requires a network management system to set up routes across the network, storing 'state' in each Ethernet switch. The state is an entry in the forwarding table at each switch along a chosen route. Assigning VIDs to different routes in a piecemeal fashion can quickly use a large number of different VIDs, requiring switches in a network to store a large amount of state. VIDs are limited in number, and excessive VID consumption is deprecated because it limits the number available of VIDs available for conventional bridged operation on the same infrastructure, if desired. Storing unnecessary fast-path state also incurs a direct cost penalty on the switches.

The present invention seeks to allocate identifiers in a more optimal manner.

SUMMARY OF THE INVENTION

A method is presented for planning routes and allocating route identifiers to those planned routes in a managed frame-forwarding network. The network comprises a set of nodes interconnected by links, with each node being arranged to forward data frames according to a combination of a route identifier and a network address carried by a received data frame and forwarding instructions stored at the node. The method comprises identifying a sub-set of the nodes which are core nodes of the network. The remaining nodes are called outlying nodes. The method then builds a spanning tree off each of the identified core nodes, with the spanning tree stopping one link short of any other core node. The spanning tree defines a loop-free path between the core node at the root of the spanning tree and a set of outlying nodes. The method then plans connections between roots of the spanning trees and allocates a different route identifier to each planned connection between a pair of spanning trees.

This method simplifies the task of establishing diverse connectivity across a network. In essence, zones of connectivity are constructed (in the form of local spanning trees) around a set of core nodes acting as waypoints (selected on the basis of local mesh density) with the domain of each zone hounded by collisions with other waypoints. The criteria by which waypoints self elect is chosen such that the number of waypoints is a subset of the nodes in the network and offer a useful abstraction/summarization of connectivity. One can then consider the challenge of routing of diverse paths to simply being selecting paths that transit non-overlapping set of waypoints.

The method allocates identifiers to routes in a structured manner, which has the advantage of minimising the overall number of different identifiers that are used. This has the advantages of reducing the amount of state which needs to be stored at individual switches within the network.

A richly connected set of core nodes are selected as the waypoints according to some criterion, and used as the roots of a set of spanning trees. Each spanning tree is rooted on one core node, and includes no other core nodes. The use of a spanning tree algorithm defines a reliable loop-free path connecting a set of outlying nodes. By stopping the spanning tree short of another core node, this should create a spanning tree which serves a 'sector' of the network. The spanning tree algorithm does not need to be the Spanning Tree algorithm as defined by IEEE, and can be any other suitable algorithm which has the effect of simply connecting nodes, that means connecting all nodes with only one route existing between any pair of nodes. It is expected that outlying nodes will be served by two (or possibly more) spanning trees, which means that the outlying nodes will have routes to two core nodes. It is preferable that those routes are fully diverse, or as diverse as is possible. The results of the spanning tree analysis can be reviewed and the spanning tree can be modified. One way in which the results of the spanning tree can be modified is by modifying the value of a metric (such as link cost) associated with a link which is undesirably routed.

In some networks the identified group of core nodes can include a core node which connects only to other core nodes, and does not connect to any outlying nodes, i.e. a core node which only serves as a transit node between other core nodes. In this case, no spanning tree is built off that core node as it would not serve any useful purpose. The step of "building a spanning tree off each of the identified core nodes, stopping one link short of any other core node" will prevent a spanning tree being built off a core node which is only connected to other core nodes.

The use of STs in this way has been found to provide a good basis on which to then allocate route identifiers. Routes between nodes are always bi-directional and co-located. i.e. the forward and reverse traffic is routed along the same path.

In conventional Ethernet, because a VLAN defines a broadcast topology a single bi-directional VID is associated with a VLAN and is used for both directions of a point-to-point (p2p) connection, Connection-Oriented Ethernet, being by definition point-to-point (p2p), does not need this restriction, and we can choose to use a different VID for each direction (i.e. a destination logically chooses the VID without reference to anyone else). This we call a 'uni-directional VID'. A bi-directional VID is used for both directions across the network whereas a uni-directional VID is used for only one direction, and a different VID can be used for the other direction. The requirements of allocating VIDs are different depending on what type of VID is being used. The specific details of the process of allocating identifiers differs for the bi-directional and uni-directional cases. It has been found that where bi-directional route identifiers are used, the maximum number of required identifiers scales as a function of $C^2$, more precisely $(C \cdot (C-1))/2$, where C=number of core nodes. Where uni-directional identifiers are used, it has been found that the maximum number of required identifiers scales as a function of (C×D), where D is the number of diverse paths between the roots of ST pairs. It has been found that the actual number of required identifiers can be considerably less than these maximum bounds.

A preferred scheme uses a combination of a VLAN ID (VID) and Ethernet Destination Address (DA) to identify a route through the network, although other combinations of elements could be used.

Further aspects of the invention provide a network entity which is arranged to perform the above method and a machine-readable medium carrying instructions for causing a processor to perform the method of planning routes and allocating route identifiers.

Once identifiers have been determined using this method, they are distributed to switches at network nodes and used as forwarding instructions at those nodes. Accordingly, a further aspect of the invention provides a method of generating forwarding instructions for a node in a managed frame-forwarding network.

Further aspects of the invention are defined in the appended claims. Further advantages of the invention will be apparent from the following description.

BRIEF DESCRIPTION OF THE DRAWINGS

Embodiments of the invention will be described, by way of example only, with reference to the accompanying drawings in which:

FIGS. 5A-5C show modification of the spanning trees for a simple network example;

FIG. 10 shows the network and control plane; and,

FIG. 11 shows an example of equipment at each managed switch of the network.

DESCRIPTION OF PREFERRED EMBODIMENTS

Figure 1:
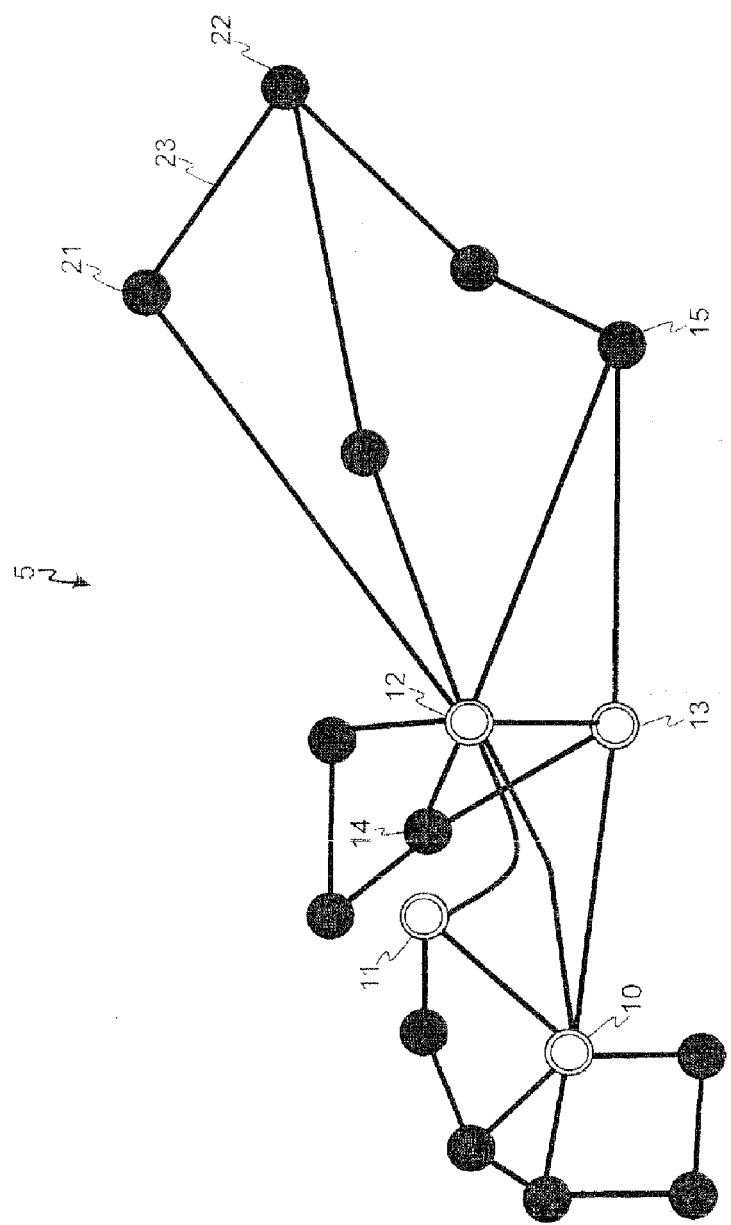
FIG. 1 shows an arrangement of Ethernet switches forming a network.

FIG. 1 shows an example Ethernet network 5 having a set of nodes (Ethernet switches) interconnected by communication links. As an example, outlying nodes 21, 22 are interconnected by a link 23.

Figure 2:
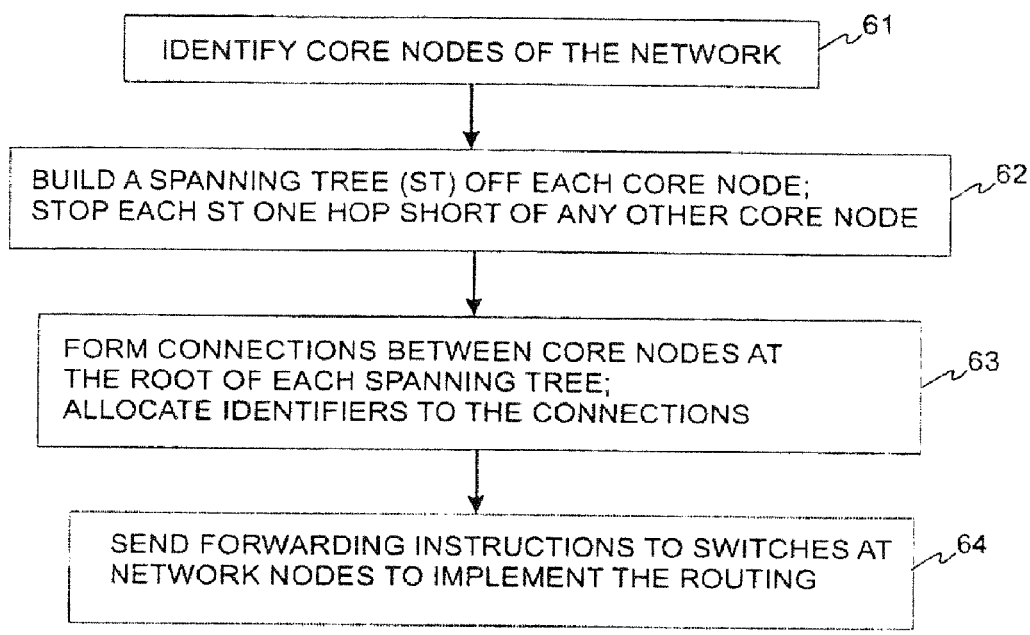
FIG. 2 shows the overall method of allocating route identifiers within the network of FIG. 1.

FIG. 2 shows the steps of a method to plan routes within the network and to optimally assign route identifiers to the routes planned within the network. As a first step 61 of analysing the network, a set of core nodes are identified. In the example network of FIG. 1, a core node is deemed to be a node which is directly connected to four or more other nodes. It can be seen that the nodes 10, 12 and 13 each meet this criterion. In this case of node 13, it is connected to nodes 10, 12, 14 and 15. It will generally be found that the core nodes will be major Points of Presence (PoP) or Transit points. The criterion for a node being a core node is not restricted to the test described here. Generally it can be a node which is connected to N other nodes (where N is set at a value which is found to offer good results) and it may be desirable to select nodes according to an additional criterion or according to at least one alternative criterion. As an alternative to automatically selecting the core nodes by an algorithm, the core nodes can be selected manually or according to design intent, i.e. selecting those nodes which the planners of the network, when laying out the network, intended to be used for transit. In this example, it is desirable that node 11 is designated a core node. Although node 11 does not meet the strict criterion of "connected to four or more other nodes" the design intent of this node is that it should be used for transit. Therefore, the total set of core nodes in this network is the set of nodes 10-13. In a network environment where there is a carrier network and customer (edge) networks, the core nodes are restricted to the nodes of the carrier network.

Figure 3:
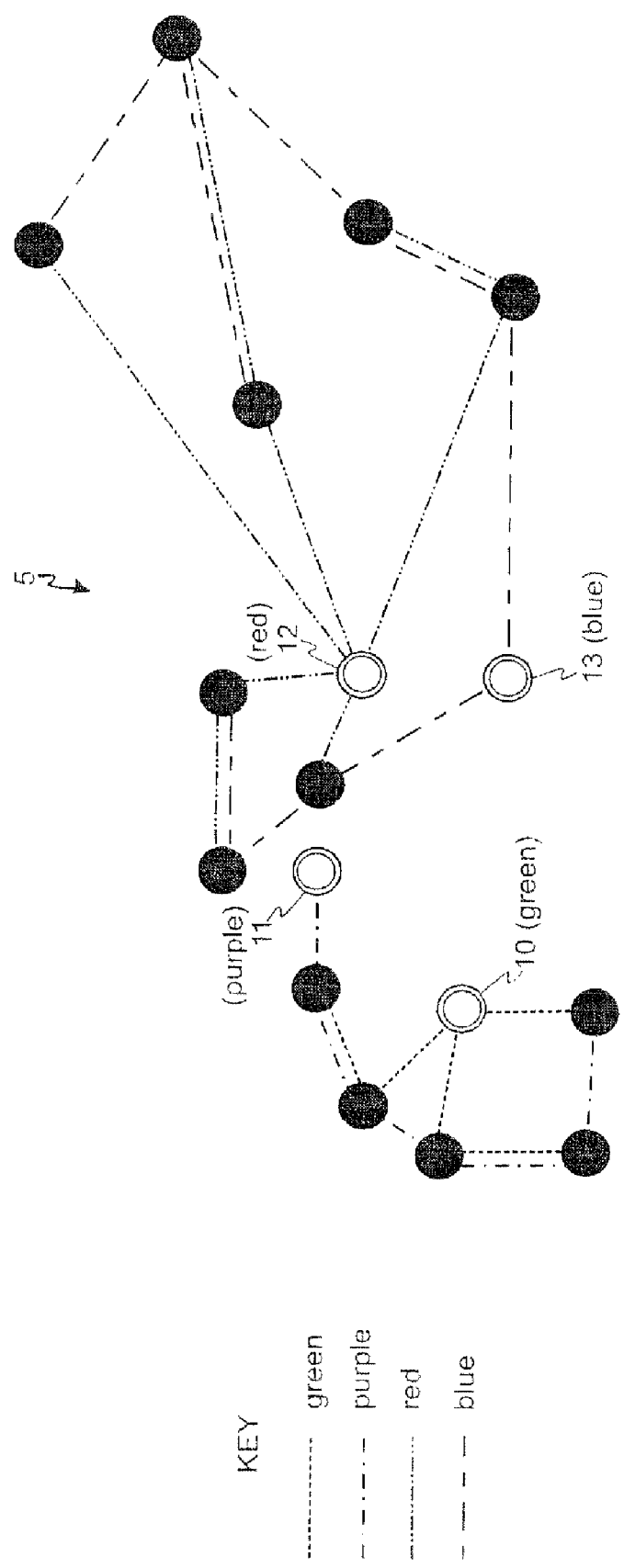
FIG. 3 shows the results of identifying core nodes of the network and constructing spanning trees off the core nodes.

FIG. 3 shows the next step (62, FIG. 2) of the method. A spanning tree is built off each of the identified core nodes 10-13. One well-known way of creating a spanning tree is the result of performing the Spanning Tree network protocol (STP) as defined in IEEE 802.1d, but any other algorithm can be used that forms a simply-connected tree (defined as having only one path between any pair of nodes). This is a known feature of Ethernet technology where each node examines how it is connected to other nodes in the network and establishes the best, loop-free, route to neighbouring nodes. The results can be expressed as a tree diagram with the starting node at the top and branches leading off representing the hops needed to reach other nodes. The spanning tree algorithm is influenced by features of a link such as link cost, where the link cost is a notional weighting value which influences the computation. In this invention, each spanning tree is stopped one hop before reaching another core node. As an example, it can be seen that the spanning tree built off core node 10 (green) stops one hop short of core node 11 (purple) and similarly the spanning tree built off core node 11 (purple) stops one hop short of core node 10 (green). For useful results, core nodes should generally be chosen so that the spanning trees built off them only cover a 'sector' of the network, which is generally directed outwards from the core nodes.

The first pass of the method described above results in the set of spanning trees shown in FIG. 3. The results of this first pass are generally successful but there are a few places with non-ideal routing. This is to be expected when applying a general technique to a real network topology. The main concern is that where a node is served by two core nodes (known as 'dual-homing') the two routes to the node should be diverse, i.e. paths arrive at the node from different directions. Looking at FIG. 4, in the places ringed 31-34 in FIG. 4 the results are useful. Taking the node 32, it is dual-horned to core nodes 10 and 11 via paths that arrive at the node 32 from different directions. However, in a small number of cases the results of the automatic spanning trees are undesirable. These are shown as 35, 36. Node 35 is dual-homed to core nodes 10 and 11 but the routes from the core nodes 10, 11 to the node 35 are routed in the same direction, i.e. the link segments are co-directed. Similarly, node 36 is dual-horned to core nodes 12 and 13 but the routes from the core nodes 12, 13 to the node 36 are co-directed. To improve the effectiveness of the spanning trees, all spanning tree segments travelling in same direction along a link are identified (i.e. the situations shown as 35, 36) and the cost of the co-directed links is increased. The Spanning Tree algorithm is performed again for each of the core nodes which serve the node having the co-directed links. The increased cost of the problematic link should force one of the spanning tree algorithms to find an alternative route. This method is a basis of finding diversely routed paths between periphery nodes and the core network.

FIGS. 5A-5C show a sequence of steps for modifying a Spanning Tree operation. For clarity, a simple network topology representing part of an overall network is shown in FIG. 5A. FIG. 5A shows two core nodes 50, 51 (other links to the core nodes are not shown) and a set of four nodes 52-55 which are interconnected by links 56 as shown. FIG. 5B shows the results of performing a Spanning Tree operation on each of the core nodes 50, 51. Core node 50 has a simple ST with the single branch 57 which connects (in order) to nodes 52, 53, 55 and 54. Core node 51 has a ST with two branches. A first branch 58 connects to nodes 52 and 53 while a second branch 59 connects to nodes 54 and 55. It can be seen that node 53 is dual-homed to core nodes 50, 51 but that it is served by links of Spanning Trees 57, 58 which are co-directed. Thus, if a failure occurred in the transport network on link 60, node 53 would fail to be connected to both of core nodes 50, 51. FIG. 5C shows how this problem can be corrected. The cost of link 60 is increased. This forces the Spanning Tree algorithm to adapt so that branch 58 no longer extends to node 53. Instead, branch 59 now extends to node 53 via node 55.

Figure 4:
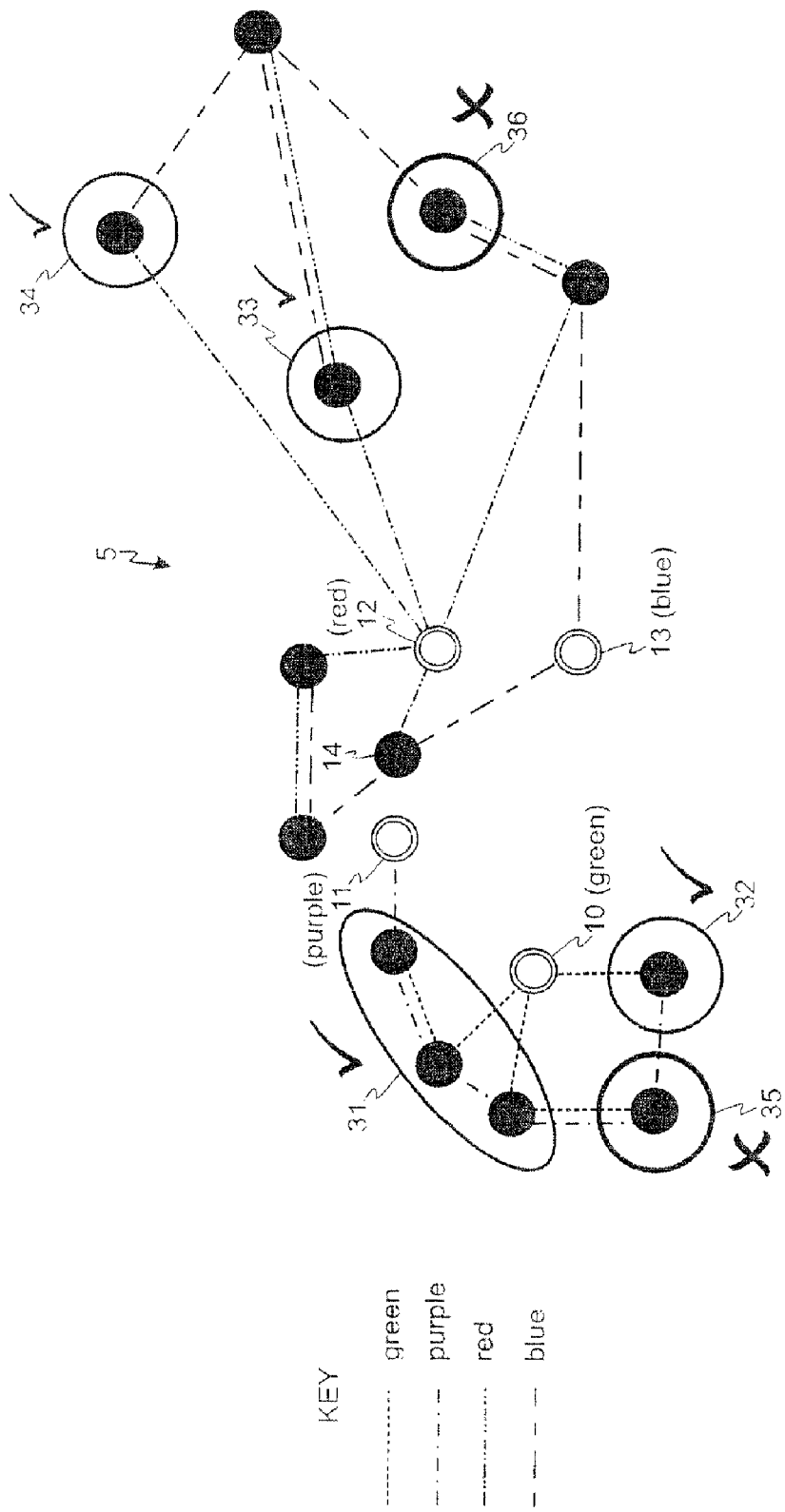
FIG. 4 shows parts of the network where spanning trees require modification.
Figure 6:
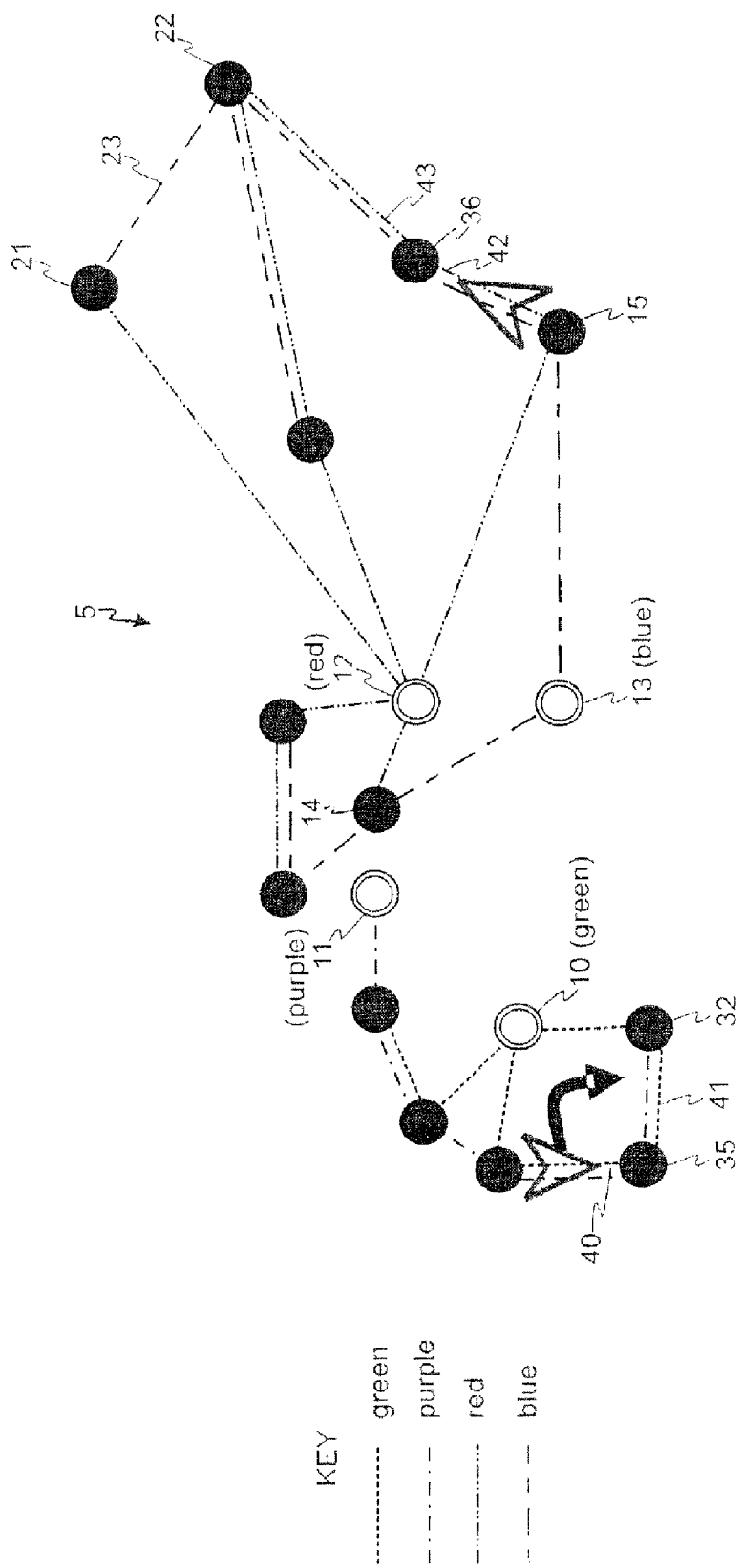
FIG. 6 shows the results of modifying the spanning trees shown in FIG. 4.

FIG. 6 shows the results of modifying the spanning trees of the network shown in FIG. 4. At node 35, the previous path into node 35 from core node 10, via link 40, is rerouted via node 32 and link 41 as a result of increasing the cost of link 40. Similarly, at node 36, the previous path into node 36 from core node 12 via link 42 is rerouted via node 22 and link 43 as a result of increasing the cost of link 42. The optimised set of spanning trees are used in the next step (63, FIG. 2) of the method.

As an alternative to automatically optimising the spanning trees, they can be manually modified after their initial computation, or iteratively optimised by a repeated sequence of automatic calculation and manual modification.

Figure 7:
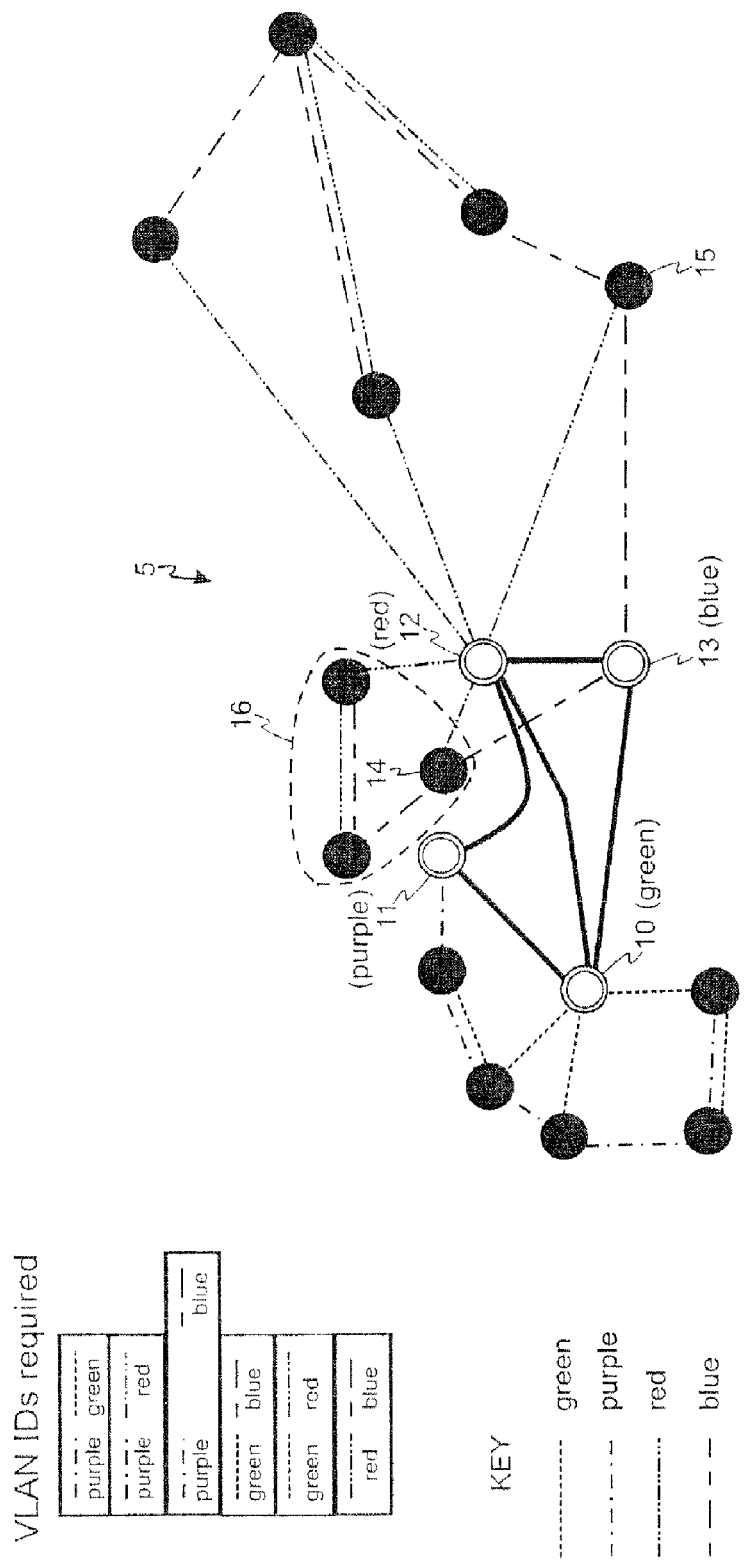
FIG. 7 shows allocation of bi-directional VIDs to the network of FIG. 6.

FIG. 7 now considers planning the connections between core nodes. An end-to-end (e2e) route between two outlying nodes of the network can be seen, in general, as a concatenation of:
(i) a segment between the first outlying node and a core node;
(ii) a segment between core nodes of the core network; and
(iii) a segment between a core node and the second outlying node.

From the analysis above, it has been shown that one VID can uniquely identify a route between all nodes on a spanning tree (ST) and a respective core (root) node of that spanning tree. The core (root) node acts as a waypoint for traffic on that spanning tree. The requirements of the core network will now be considered based on the topology shown in FIG. 7. Each route between a unique pair of core nodes requires a unique VID. Some of these routes are a single hop, as in the case of core nodes 11-10, 11-12, 10-13, 10-12 and 12-13. Due to the core network topology, the route between core nodes 11-13 requires two hops and passes via core node 12. (There is also a second possible two-hop route between core nodes 11-13 which passes via core node 10 which will be considered later.)

All connections are always bi-directional and co-routed, i.e. the forward and reverse traffic is routed along the same path. In conventional Ethernet, because a VLAN defines a broadcast topology a single bi-directional VID is associated with a VLAN and is used for both directions of a p2p connection. Connection-Oriented Ethernet, being by definition point-to-point (p2p), does not need this restriction, and we can choose to use a different VID for each direction (i.e. a destination logically chooses the VID without reference to anyone else). This we call a 'uni-directional VID'. A bi-directional VID is used for both directions across the network whereas a uni-directional VID is used for only one direction, and a different VID can be used for the other direction. The requirements of allocating VIDs are different depending on what type of VID is being used.

Firstly, the requirements of bi-directional VIDs are considered. A pair of spanning trees are stitched together across the core. Core nodes will typically have full (or near-full) mesh connectivity between them, but this is not a necessary requirement. Using a bi-directional VLAN tag, each ST rooted on a core node must be coupled with every other ST for universal e2e connectivity. For the four core nodes shown, this requires 3+2+1=6 VIDs as shown in the table in FIG. 7. One unique VID is allocated to each ingress/egress ST pair. In general, for a core having C core nodes:

$$\text{Number of VIDs} = \frac{C(C-1)}{2}$$

In this manner, an end-to-end route between outlying nodes via any core node(s) to which they are joined by spanning trees can be uniquely identified by a relatively small number of VIDs. In the above example, only 6 VIDs are required for basic connectivity. The term 'basic connectivity' means providing a single connection between every pair of core nodes. In the example shown in FIG. 6, there are two possible routes between core nodes 11, 13—one route passing via node 12 and the other route passing via node 10. It is possible to distinguish between these routes by using an additional VID. This is a further VID over and above the number just defined for basic connectivity.

With reference to FIG. 7, suppose we wish to establish two distinct routes across the core from the peripheral nodes on purple and green STs to those on red and blue STs:
the route 11⇔12 has no core nodes in common with the route 10⇔13, and so communication is resilient to any single point of failure
but the routes 10⇔12 and 11⇔13 via 12, although having disjoint terminations, all pass through core node 12 which is therefore a single point of failure.

Earlier, we described methods to ensure that overlapping STs rooted on different core nodes were not co-directional, and so achieved disjoint routes between each outlying node and more than one core node if this was possible; this combined with this selection of disjoint routes across the core makes this resilience to any single point of failure an end-to-end property for all nodes.

So far, each core node has been described as having one ST. It is possible to build multiple STs per core node for traffic engineering purposes. If these STs intersect away from the core node, this gives rise to a loop. Therefore it is necessary to provide a different VID for each intersecting ST. Disjoint (i.e. non-overlapping) STs from a single core node can use a single VID as the destination node address alone will be unambiguous at any point in either ST.

Next, the requirements of un-directional VIDs are considered. For clarity, the network of FIG. 7 has been simplified to that shown in FIG. 8 by replacing the group of nodes 16 with a single node 17. This new node 17 has the same connectivity to the core nodes as the group of nodes 16. The method is illustrated with respect to the topology of FIG. 8. This topology has just four core nodes 10-13. To start with, a VID is assigned to each of the STs in turn, which has the meaning that traffic to be routed off the core does so via the core node at the root of that ST. So:

traffic, for the <green> ST leaves the core via node 10;
traffic for the <purple> ST leaves the core via node 11;
traffic for the <red> ST leaves the core via node 12; and,
traffic for the <blue> ST leaves the core via node 13.

It is straightforward to observe that if the four VIDs have different numerical values, then no ambiguities in route designation can occur. Whatever the ingress side topology, a unique single route to an endpoint can be defined passing through the core node which roots the selected ST.

Next, we can state that if a pair of core nodes have STs with any nodes in common, they must have different VIDs because otherwise there would clearly be ambiguity, viewed from the ingress side, by which ST/code node the core should be egressed. By the same reasoning, ST/core nodes with no common nodes on their STs can adopt the same VID, because the respective STs have no MAC addresses in common and thus the MAC address can distinguish the routing to the destination.

Figure 8:
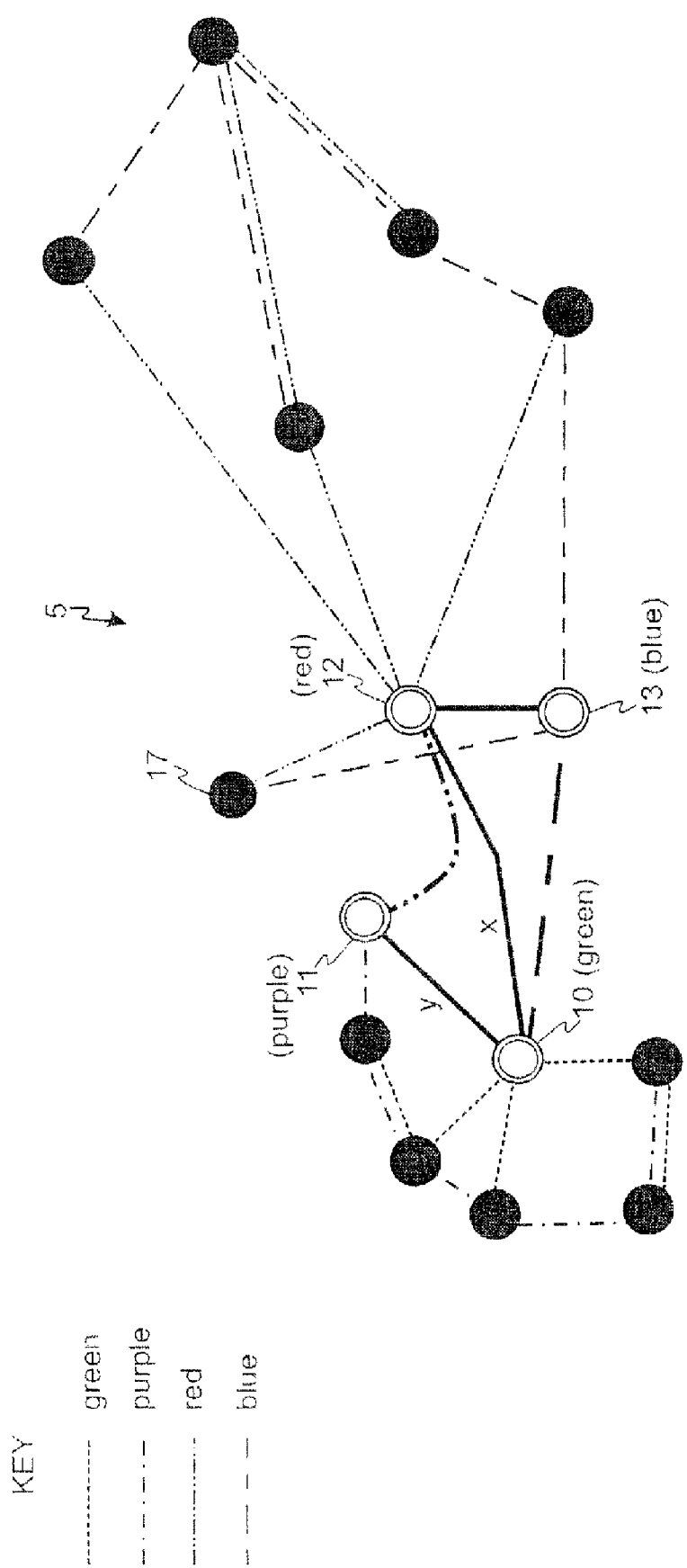
FIG. 8 shows allocation of uni-directional VIDs to the network of FIG. 6.

In the example of FIG. 8, the VID associated with <green> egress can have numerically the same value as either <blue> or <red> (but not <purple>). The VID associated with <purple> can also have numerically the same value as either <blue> or <red>. The VIDs associated with <red> and <blue> must be mutually different, as must the VIDs associated with <green> and <purple>, because each pair of STs has nodes in common.

End-to-end routes can now be formed. Each VID defining an egress node and its associated ST defines a single route across the core between nodes on an ingress ST and its associated core node. This is because of the requirement that both directions must be co-routed, thus the bi-directional route must be formed by joining a pair of spanning tress across the core. So, the connection of <purple> to <red> (and vice-versa), and <green> to <blue> (and vice-versa) defines one pair of bi-directional routes across the core. Similarly, the connection of <purple> to <blue> (and vice-versa) via, for example, node 12, and <green> to <red> (and vice-versa) defines another pair of bi-directional routes across the core. Both are legitimate. However, as only the former option offers completely diverse routes, this is therefore likely to be the preferred binding.

The other case to consider is traffic between nodes on the same spanning tree or (often) pair of spanning trees. Consider the example of nodes subtended by core nodes 12 and 13 (<blue> and <red>). Traffic between these nodes is constrained to run either on the paths defined by the <red> VID, or the <blue> VID; both are installed out from core nodes 12 and 13 respectively. It can be seen that traffic within a specific ST uses the same VID in both directions (i.e. same as bi-directional VID, as described earlier). In the example given, the availability of two STs and hence two VIDs offers alternate routes.

In each case the minimum number of VIDs required is two, e.g. assignments <purple>=10, <red>=10, <green>=12, <blue>=12 is one valid assignment which obeys the rules given above; provided that the rules are obeyed, core nodes may be assigned VIDs otherwise independently, to minimise their own VID usage under the particular routing constraints to which they are subject.

The number of VIDs required increases whenever an alternative route across the core is required. Recall the discussion earlier which showed that a VID defined the egress node from the core, and a single route to that node from any other node, for example connection of <green> to <blue> (and vice-versa) defines a bi-directional route across the core. If it is desired to send some traffic from node 10 via link "x" to egress through node 12 its destination, an extra VID must be assigned to allow node 10 to steer the traffic between nodes 12 and 13. In the reverse direction an extra VID must also be assigned for a copy of the <green> ST rooted on 10, to allow node 12 to steer traffic between nodes 11 and 10, because <purple> and <green> STs are not disjoint, and so the route to be taken traffic for nodes on both STs cannot be disambiguated by MAC address alone at core node 12.

The VID numerical values obey the same rules as earlier; two VIDs must be different unless the egress STs with which they are associated have no nodes in common. Thus, the first extra VID to select the route from 10 to 12 via "x" cannot be the same as that assigned either to <red> or <blue> because the extra VID duplicates the <red> one or egress from node 12. Similarly, the VID in the reverse direction on "x" cannot be the same as that assigned either to <green> or <purple> because the extra VID duplicates the <green> one on egress from node 10. Stated another way, if a single ST (in the ingress direction) is to be offered D distinct core routes to a target "egress" ST, it must use D VIDs to select the route, and these D VIDs must be distinct from the VID(s) used by a other non-disjoint "ingress" ST to reach the same "target" egress ST.

The process for allocating uni-directional VIDs can be summarised as:

allocate a VID to each of the C core nodes, which gives a maximum of C (=4 in this example)

STs which are disjoint, or which touch only at core nodes, can share the same VID because MAC addresses in each ST are then by definition disjoint too (in this example giving a base requirement for 2 VIDs only.)

allocate further VIDs to support route diversity D between ST pairs; this requires D VIDs.

It can be seen that the upper bound of total VID use for this approach scales as C×D although the actual number of VIDs used can be less.

In summary, for the uni-directional case, with independently chosen VIDs in each direction, it is only necessary to ensure that the egress STs are not common. However, because a bi-directional VID is e2e (the disjoint ST constraint applies simultaneously at both ends), it is possible to reuse a VID only on two pairs of STs where no elements are common, i.e. where no node on either of the STs is common with any other ST.

The description above is of a network having a core network of nodes and sectors serving outlying nodes, with a pair of outlying nodes being connected by a concatenation of a segment between the first outlying node and a core node, a core network segment, and a segment between a core node and the second outlying node.

Figure 9:
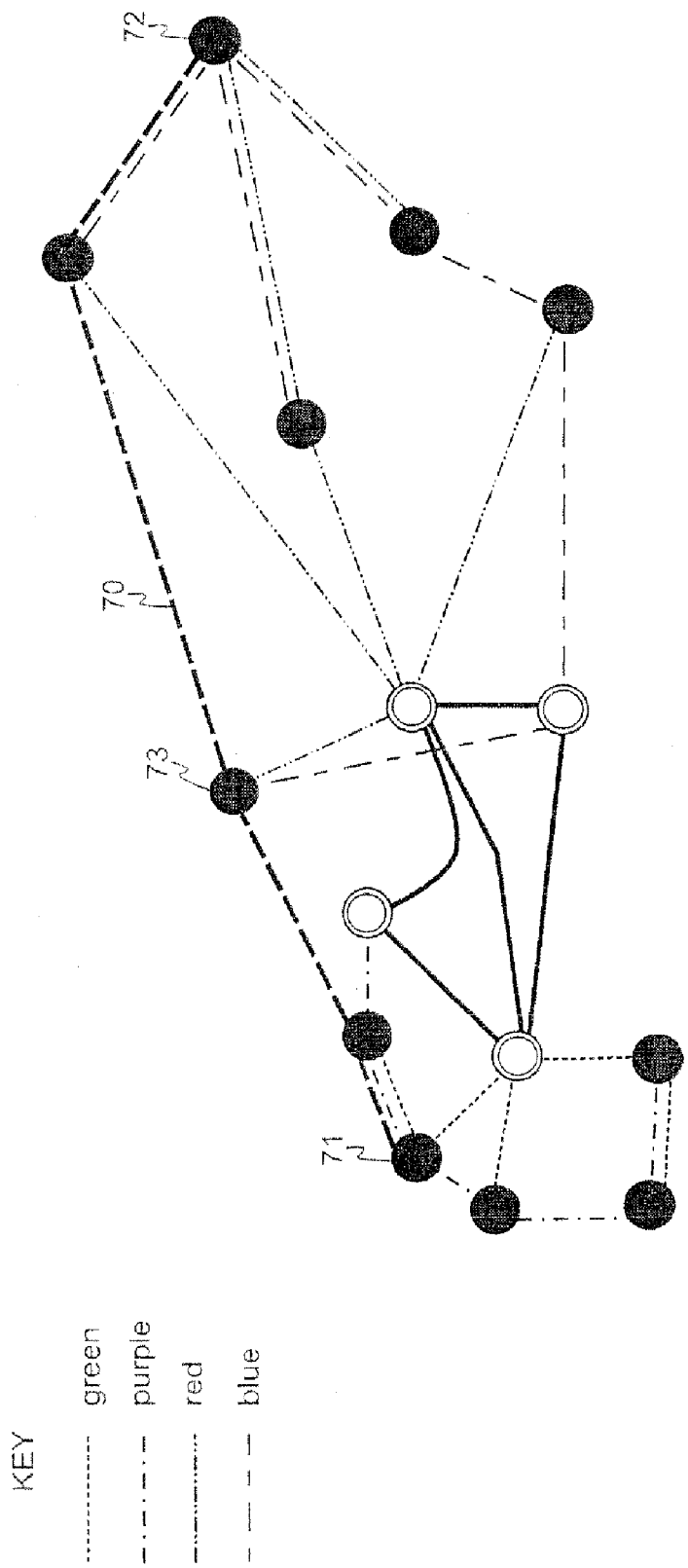
FIG. 9 shows the use of short cut routes in the network of FIG. 8.

It is sometimes desirable to install 'backdoors' in a network to offer a short-cut path between busy nodes without going through the network core. FIG. 9 shows an example backdoor path 70 between nodes 71, 72. This can be constructed by blocking core node. STs at the backdoor path transit node 73. This prevents unwanted extension of core node STs. A restricted length ST is built, rooted on the backdoor path transit node 73, using the same construction rules as core routes. This means that the ST stops short of any other core node. A bi-directional VID is allocated to that bypass ST.

The method described above is used to plan the provision of VIDs to routes across the network with the goal of creating forwarding state which is both valid and minimised. Steps 61-63 of the method, i.e. selecting core nodes, and creating spanning trees, are tools which are used as part of the planning method. Once the planning method has been performed, routes are established within the network by instructing (step 64, FIG. 2) switches at the individual network nodes to store forwarding state.

The above described method is used incrementally, multiple times. On first deployment, one would expect to build the base set of routes to satisfy resilience (diverse path) criteria, and load traffic onto those routes. Then, if a new route through the existing network needed to be created for traffic engineering reasons, one would create this across the core by adding extra VIDs as appropriate, according to the same rules. Similarly, as new plant is added to the network (i.e. switches or physical links), appropriate steps of the method are applied incrementally as part of the process of bringing into service.

FIG. 10 schematically shows a number of switches 87 deployed in a network and a control plane of the network. A network planning system 80 includes a processing system 81 which performs the method described above of analysing the network and allocating route identifiers (VIDs) in an optimum manner. Network topology data 82 is acquired either from a local or remote store, or by interrogation of the network elements themselves, for use in analysing the network. Once an optimum allocation of identifiers has been determined, this data is forwarded to a connection controller 85. The connection controller communicates with each Ethernet switch 87 deployed in the network. Connection controller 85 sends signalling information 86 to each switch 87 which instructs the switch to store forwarding instructions to implement the allocation determined by processor 81. The instructions will take the form, for example of: forward frames with a destination MAC_address1 and VID1 arriving at port X of the switch to port Y of the switch, and forward return-path frames with destination MAC_address2 and VID2 arriving at port Y to port X. The instructions are specific to each switch 87. Although a single connection controller (CC) is shown here, there can be a set of such controllers which are distributed throughout the network.

FIG. 11 shows an example of equipment at each managed Ethernet switch 100. The switch 100 has a set of ports 110-117 which are interconnected by a switch fabric 140. One such port 110 is shown in detail and each port has the same structure. Ethernet ports are bi-directional and comprise an ingress section 120 and an egress section 130 which share a common MAC address. The ingress section 120 has a line interface 124 which connects to a communication link 127. The line interface converts the incoming signal from a format used on the line 127 to a baseband electrical digital signal which can be used by the following stages. Typically, this involves receiving, and demodulating, an optical signal and decoding the demodulated signal from a line code used for transmission. For each frame, stage 125 determines a destination port of the switch that the frame should be sent to by examining fields within the frame and a priority for that frame. In the preferred scheme just described, this requires stage 125 to inspect the destination address field and the VLAN tag field of the frame. A look-up table 123 is stored in a memory 122 local to the port. Stage 125 performs a look-up operation using the destination address and VLAN tag to identify the port that the frame should be sent to. Stage 125 sends the frame to the appropriate buffer 126 where the frame is queued before the switch fabric transfers the frame to the required destination port. Typically, a switch will transfer fixed sized blocks of data across the switch fabric (e.g. cells 80 bytes in length) to maximise efficiency of the switch and to minimise blocking between switch ports, but this is not important to the invention and the switch can use any technology for the switch fabric. At the egress section of the destination port the blocks are reassembled in a buffer 131 before being sent to a line interface 134. Typically, this will involve encoding the data frame with a line code and modulating the electrical digital signal onto an optical carrier.

Each port is associated with a port controller 121 which is responsible for maintaining the forwarding table 123 at that port. Port controller 121 communicates with a switch controller 102. Port controller 121 is essentially a 'housekeeping' processor which performs tasks locally at the port, in response to instructions received from switch controller 102. Switch controller 102 maintains a master forwarding table 104 in storage 103 local to the controller 102 and communicates via a signalling interface 105 to a connection controller. As connections across network 5 are set-up, changed (e.g. due to traffic management operations) or torn down, switch controller 102 receives instructions to add or remove entries in the forwarding table 104 from a network connection controller. The information received at switch controller 102 from a Network Management System will typically refer to a physical address and will set up a bi-directional path (i.e. forward and return paths) at the same time {i.e. forward frames with destination MAC_address1 and VLAN1 arriving at port X to port Y; forward return-path frames with destination MAC_address2 and VLAN2 arriving at port Y to port X}. Updated forwarding information is distributed by switch controller 102 to individual port controllers. In an alternative, simplified, switch the local forwarding table 123 at each port is omitted and only a single forwarding table 104 is used.

The invention claimed is:

1. A method of planning routes and allocating route identifiers in a managed frame-forwarding network, the network comprising a set of nodes interconnected by links, with each node being arranged to forward data frames according to a combination of a route identifier and a network address carried by a received data frame and forwarding instructions stored at the node, the method comprising:

identifying a sub-set of the nodes which are core nodes of the network, the remaining nodes being outlying nodes;

building a spanning tree off each of the identified core nodes, with the spanning tree stopping one link short of any other core node, the spanning tree having a root and defining a loop-free path between the core node at the root of the spanning tree and a set of outlying nodes; and, planning connections between roots of the spanning trees and allocating a different route identifier to each planned connection between a pair of spanning trees.

2. A method according to claim 1 wherein planning the connections between roots of the spanning trees plans a set of connections which minimizes the number of single points of failure common to more than one different connection between each pair of outlying nodes.

3. A method according to claim 1 wherein building the spanning tree off each of the identified core nodes is arranged such that, where an outlying node is served by spanning trees rooted on two different core nodes, the paths of the two spanning trees are differently directed to that outlying node.

4. A method according to claim 1 wherein identifying the core nodes in the network comprises identifying a core node as a node which is connected to at least N other nodes.

5. A method according to claim 1 wherein the identifier is the same for both directions of information transfer along a bi-directional co-routed path between two nodes, and wherein planning the connections between the roots of pairs of the spanning trees connects each spanning tree with every other spanning tree and allocates a different route identifier to each planned connection.

6. A method according to claim 5 wherein allocating route identifiers must only allocate a different route identifier to a connection between a pair of spanning trees where the outlying nodes served by either of the spanning trees in the pair overlap with any of the outlying nodes served by another spanning tree.

7. A method according to claim 6 wherein the route identifier is an Ethernet Virtual Local Area Network (VLAN) Identifier (ID) and the network address is an Ethernet Destination Address.

8. A method of generating forwarding instructions for a node in a managed frame-forwarding network, the network comprising a set of nodes interconnected by links, with each node being arranged to forward data frames according to a combination of a route identifier and a network address carried by a received data frame and forwarding instructions stored at the node, the method comprising:
 planning routes and allocating identifiers in the managed frame-forwarding network by:
  identifying a sub-set of the nodes which are core nodes of the network, the remaining nodes being outlying nodes;
  building a spanning tree off each of the identified core nodes, with the spanning tree stopping one link short of any other core node, the spanning tree having a root and defining a loop-free path between the core node at the root of the spanning tree and a set of outlying nodes; and,
  planning connections between roots of the spanning trees and allocating a different route identifier to each planned connection between a pair of spanning trees; and,
 generating forwarding instructions for a node based on the planned route and allocated identifier for that route.

9. A method according to claim 8 further comprising sending the generated forwarding instructions to the node.

10. A non-transitory machine-readable medium carrying instructions for causing a processor to perform a method of planning routes and allocating route identifiers in a managed frame-forwarding network, the network comprising a plurality of nodes interconnected by links, with each node being arranged to forward data frames according to a combination of a route identifier and a network address carried by a received data frame and forwarding instructions stored at the node, the method comprising:
 identifying a sub-set of the nodes which are core nodes of the network, the remaining nodes being outlying nodes;
 building a spanning tree off each of the identified core nodes, with the spanning tree stopping one link short of any other core node, the spanning tree having a root node and defining a loop-free path between a core node at the root of the spanning tree and a set of outlying nodes; and,
 planning connections between roots of the spanning trees and allocating a different route identifier to each planned connection between a pair of spanning trees.

11. A managed frame-forwarding network comprising:
 a set of nodes interconnected by links, with each node being arranged to forward data frames according to a combination of an identifier and a network address carried by a received data frame and forwarding instructions stored at the node;
 a network planning entity for planning routes and for allocating route identifiers to routes within the network, the entity being arranged to:
  identify a sub-set of the nodes which are core nodes of the network, the remaining nodes being outlying nodes;
  build a spanning tree off each of the identified core nodes, with the spanning tree stopping one link short of any other core node, the spanning tree having a root node and defining a loop-free path between the core node at the root of the spanning tree and a set of outlying nodes; and,
  plan connections between roots of the spanning trees and allocate a different route identifier to each planned connection between a pair of spanning trees; and
 a connection controller which is arranged to generate forwarding instructions to cause the nodes to implement the routes planned by the network planning entity.

12. A method of planning routes and allocating route identifiers in a managed frame-forwarding network, the network comprising a set of nodes interconnected by links, with each node being arranged to forward data frames according to a combination of a route identifier and a network address carried by a received data frame and forwarding instructions stored at the node, the method comprising:
 identifying a sub-set of the nodes which are core nodes of the network, the remaining nodes being outlying nodes;
 building a plurality of spanning trees, wherein each spanning tree comprises one of the core nodes at a root of the spanning tree, with the each spanning tree stopping one link short of any other of the core nodes, the each spanning tree defining a loop-free path between the one of the core nodes at the root of the spanning tree and a set of outlying nodes, wherein at least some of the plurality of spanning trees are disjoint from one another; and,
 planning connections between pairs of spanning trees, and allocating a unidirectional ingress route identifier and unidirectional egress route identifier to each planned connection, wherein a same unidirectional egress route identifier is allocated to an egress route from a first spanning tree to multiple disjoint second spanning trees.

13. The method of claim 12, wherein the unidirectional ingress route identifiers and the unidirectional egress route identifiers comprise Virtual Local Area Network (VLAN) Identifiers (ID).

* * * * *